(12) United States Patent
Eguchi

(10) Patent No.: US 6,371,883 B1
(45) Date of Patent: Apr. 16, 2002

(54) VEHICULAR TRANSMISSION CONTROL SYSTEM

(75) Inventor: Takahiro Eguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/594,575

(22) Filed: Jun. 15, 2000

(30) Foreign Application Priority Data

Jul. 6, 1999 (JP) .......................................... 11-191317

(51) Int. Cl.[7] ............................................... B60K 41/28
(52) U.S. Cl. ............................. 477/73; 477/74; 477/75; 477/107; 477/173
(58) Field of Search ................................ 477/107, 167, 477/170, 173, 175, 111, 73, 74, 75

(56) References Cited

U.S. PATENT DOCUMENTS 6,190,284 B1 * 2/2001 Kuroda et al. .............. 477/107

FOREIGN PATENT DOCUMENTS

| JP | 407026996 | * | 1/1995 |
| JP | 10205365 | * | 8/1998 |
| JP | 410205365 | * | 8/1998 |

* cited by examiner

*Primary Examiner*—Sherry Estremsky
(74) *Attorney, Agent, or Firm*—Armstrong, Westerman & Hattori, LLP (57) ABSTRACT

A vehicular transmission comprises an engine E, a continuously variable transmission CVT and a starting clutch 5. The driving force from the engine E is conveyed through the continuously variable transmission CVT with a speed change to a countershaft 2, and the starting clutch 5 is used to convey this driving force from the countershaft 2 to wheels of a vehicle. In this power transmission, when the vehicle is decelerated for a halt, the fuel supply to the engine is terminated to decelerate the vehicle. In addition, the starting clutch 5 is released gradually under a predetermined condition, and then the engine E is stopped to bring the vehicle into a halt.

7 Claims, 6 Drawing Sheets

VEHICULAR TRANSMISSION CONTROL SYSTEM

FIELD OF THE INVENTION

The present invention relates generally to a vehicular transmission which comprises a speed change mechanism and a main clutch (also referred to as "starting clutch") and which controls mechanical power transmission from an engine with speed change control performed by the speed change mechanism and the main clutch.

BACKGROUND OF THE INVENTION

Such vehicular transmissions have been used for mechanical power transmission in vehicles. As speed change mechanisms incorporated in these transmissions, not only gear transmissions with a plurality of speed ratios but also continuously variable transmissions with a belt, etc. have been used for speed change control. Recently, a hybrid transmission which uses an electrical motor in addition to an engine has been introduced for fuel efficiency. The applicant of the present invention is also developing a hybrid transmission. This hybrid transmission comprises a continuously variable transmission with a metal V-belt which is disposed around the common output shaft of an engine and an electrical motor arranged in series, and the output shaft of the continuously variable transmission is provided with a forward/reverse switching mechanism and a starting clutch (main clutch).

One purpose for developing this transmission is to improve fuel efficiency. Therefore, there is a consideration that the operation of the engine be controlled such that it stops when the vehicle has stopped (referred to as "idling elimination"). As such idling elimination control, there is a method to stop the engine when the engine comes into idling after the vehicle has stopped completely. However, when the vehicle is decelerated by releasing the accelerator pedal that has been depressed, an engine brake is effected. It is known that, during this deceleration, the fuel injection to the engine is terminated (or the supply of fuel is terminated). In this situation, there is a more desirable way to eliminate engine idling. When the vehicle is decelerated to a halt, the fuel injection is terminated, so this condition should be maintained to stop the engine. This method seems more favorable for improving the fuel efficiency.

However, this idling elimination, which involves termination of the fuel injection, is likely to experience the following problem. If the vehicle is stopped while the starting clutch is in engagement, then the rotational resistance of the engine is so great that the vehicle is decelerated too rapidly for the passengers to be comfortable at the stopping. This deteriorates the riding quality of the vehicle. One cause of this problem is the control executed for changing the speed ratio of the transmission to a LOW ratio when the vehicle is to be stopped. This shifting to the LOW ratio just before the halt of the vehicle makes the effect of the engine brake remarkably strong. On the other hand, if the starting clutch is released when the engine is allowed to stop, then no engine brake can be achieved, which also reduces the riding quality of the vehicle.

SUMMARY OF THE INVENTION

It is an object of the present invention to provide a control system for a vehicular transmission which system eliminates engine idling without impairing riding quality when the vehicle decelerates and stops after fuel supply termination.

In order to achieve this objective, the present invention provides a control system for a power transmission which is used for driving a vehicle. This power transmission conveys the driving force of an engine through a speed change mechanism (for example, the continuously variable transmission CVT of the embodiment described in the following section) and a main clutch (for example, the starting clutch 5 of the following embodiment). The speed change mechanism performs a speed change, and the main clutch is used to turn on and off of the transmission of the driving force. In this power transmission, while the vehicle is being decelerated for a halt, the control system terminates the fuel supply to the engine for decelerating the vehicle, releases the main clutch gradually under predetermined conditions, and then stops the engine so as to bring the vehicle into a halt.

According to the present invention, while the vehicle is being decelerated by the termination of the fuel supply to the engine, if the predetermined conditions are satisfied, the main clutch is released gradually, and then the engine is stopped to bring the vehicle into a halt. Therefore, an engine brake effected in the deceleration is controlled to lessen gradually, and the vehicle is stopped without engine idling. In this way, not only an engine brake is effected appropriately, but also the passengers in the vehicle can sense a feel of idle running at the time of the vehicle coming to a halt. Thus, the present invention achieves for an idling elimination control as good a drive quality as that of the drive control which is executed for decelerating and stopping the vehicle without any idling elimination control.

As the above mentioned predetermined conditions, the following conditions are considered: the brake of the vehicle is being operated, the speed of the vehicle has become equal to or lower than a predetermined speed, the reduction ratio of the speed change mechanism has come to be almost at a LOW ratio, and the throttle of the engine is essentially closed. When all the conditions are satisfied, the control system releases the main clutch gradually and then stops the engine to bring the vehicle into a halt. In other words, after the driver releases the accelerator pedal and steps down the brake pedal to decelerate the vehicle, when the speed of the vehicle becomes equal to or lower than a certain low speed (for example, 15 km/h) and the speed change ratio becomes almost a LOW ratio, the main clutch is controlled to be released gradually to achieve a good drive quality for the deceleration as described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
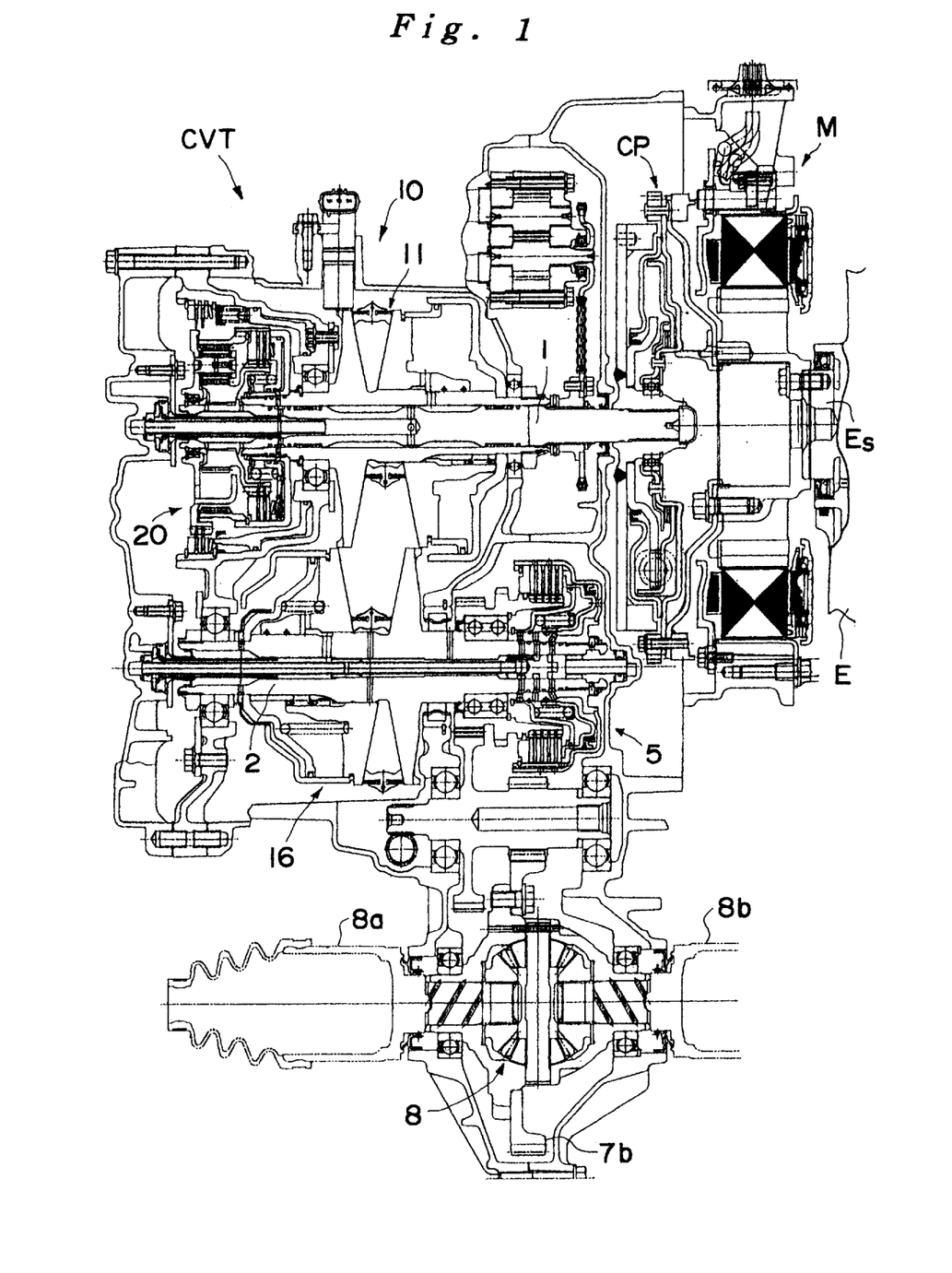
FIG. 1 is a cross-sectional view of a vehicular transmission which incorporates a control system according to the present invention.
Figure 2:
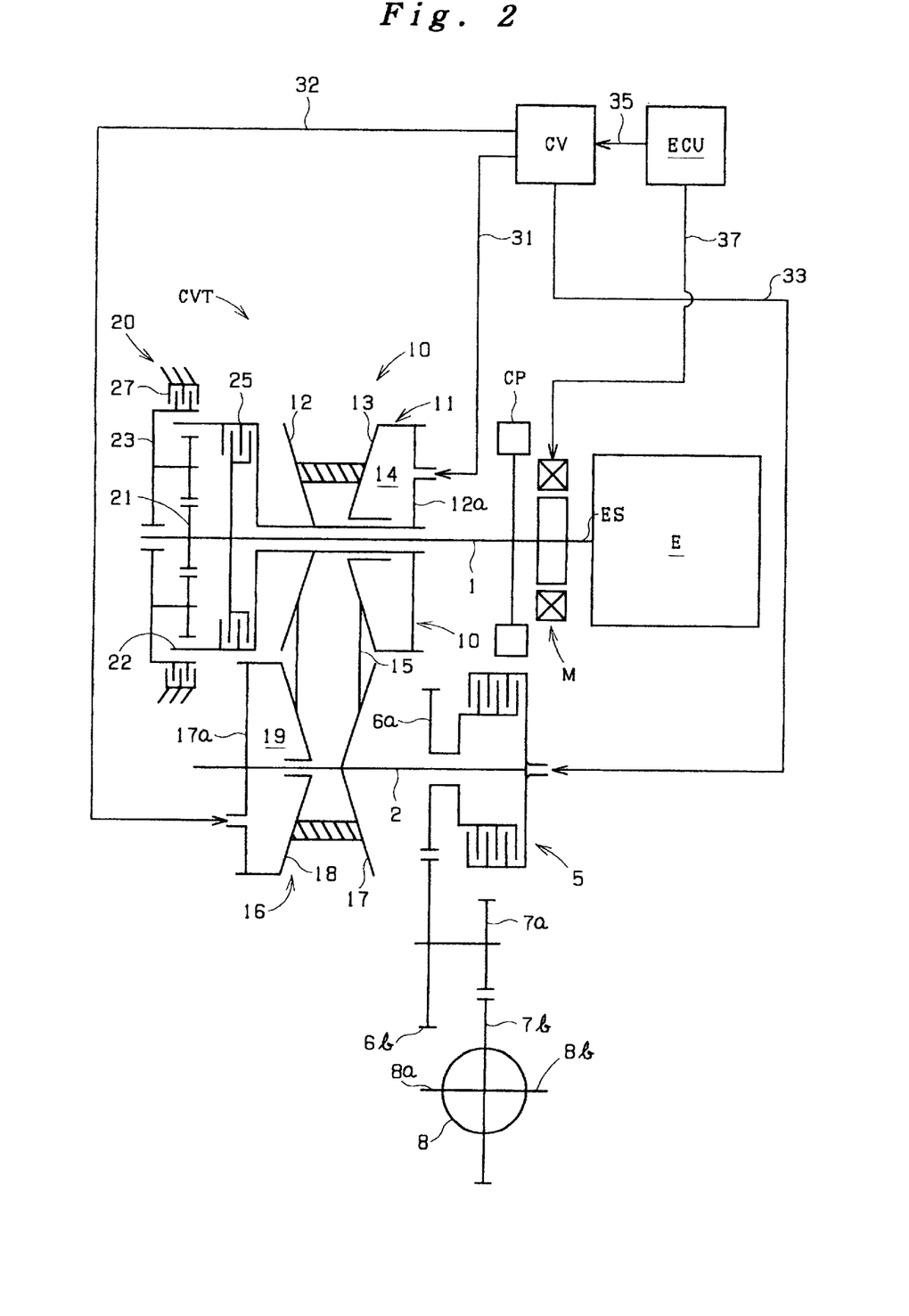
FIG. 2 is a schematic diagram showing the construction of the power transmission mechanism of this transmission.

FIG. 1 is a cross-sectional view of a vehicular transmission which incorporates a control system according to the present invention. FIG. 2 shows the construction of the power transmission mechanism of this vehicular transmission, which comprises an engine E, an electrical motor M, and a continuously variable transmission CVT. The electrical motor M is disposed over the output shaft Es of the engine while the continuously variable transmission CVT is connected through a coupling mechanism CP to the engine output shaft Es. The engine E is a fuel injection engine, so the injection of fuel into the engine is terminated when the vehicle decelerates as described in detail later in this section. The electrical motor M is powered by a battery which is mounted on the vehicle, and the electrical motor assists the driving force of the engine. In this way, the vehicular transmission is constructed as a hybrid transmission with these two power sources.

The continuously variable transmission CVT comprises a metal V-belt mechanism 10, a forward/reverse switching mechanism 20 and a starting clutch (or main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to the differential mechanism 8 and then used for driving axle shafts 8a and 8b to rotate the right and left wheels of the vehicle (not shown).

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the outside of the movable pulley half 13, a drive-pulley cylinder chamber 14 is defined by a cylinder wall 12a which is fixed to the stationary pulley half 12. The pressure supplied through a control valve CV and through an oil passage 31 into the cylinder chamber 14 (this pressure is referred to as "drive pulley pressure") generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the outside of the movable pulley half 18, a driven-pulley cylinder chamber 19 is defined by a cylinder wall 17a which is fixed to the stationary pulley half 17. The pressure supplied through the control valve CV and through an oil passage 32 into the cylinder chamber 19 (this pressure is referred to as "driven pulley pressure") generates a thrust which shifts the movable pulley half 18 in the axial direction of the driven pulley.

In this construction, the control system controls the hydraulic pressures which are supplied into these cylinder chambers 14 and 19, respectively, (the side thrusts of the drive and driven pulleys) by the control valve CV to generate appropriate lateral thrusts in these two pulleys. Specifically, the system, while preventing any slip of the belt 15, adjusts the difference between the pressures supplied to the drive and driven pulleys, so that the side thrusts generated in the respective pulleys change the widths of the V grooves of the drive and driven pulleys 11 and 16. Thereby, the pitch radii of the respective pulleys for the V belt 15 are changed to vary the speed change ratio of the transmission continuously.

Furthermore, the forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when this forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction).

The starting clutch 5 is a clutch to control the power transmission between the countershaft 2 and the output members of the transmission, i.e., gears 6a, 6b, 7a and 7b. When the starting clutch 5 is engaged, the power is transmitted therebetween. In the condition where the starting clutch 5 is engaged, the output of the engine, after undergoing the speed change by the metal V-belt mechanism 10, is transmitted through the gears 6a, 6b, 7a and 7b to the differential mechanism 8 and then divided and transmitted by the differential mechanism 8 to the right and left wheels. When the starting clutch 5 is released, this power transmission is terminated, and the transmission comes into a neutral condition. The engagement of the starting clutch 5 is carried out by a pressure supplied through the control valve CV and through an oil passage 33 (this pressure is referred to as "clutch control pressure").

In the continuously variable transmission CVT, the drive and driven pulley pressures supplied through the control valve CV and through the oil passages 31 and 32, respectively, are used for the speed change control while the clutch control pressure supplied through the control valve CV and through the oil passage 33 is used for the actuation of the starting clutch. The control valve CV itself is controlled by means of control signals sent from an electrical control unit ECU.

In the vehicle incorporating this transmission, the electrical motor M assists the engine E such that the engine E can operate in a range which is most fuel efficient. To improve the fuel efficiency of the vehicle, the operation of the electrical motor M is controlled by means of control signals which are sent from the electrical control unit ECU through a line 37. At the same time, the speed change control is performed to achieve an optimal speed change ratio for operating the engine E in a most fuel efficient manner. This control is also carried out by means of control signals sent from the electrical control unit ECU through a line 35 to the control valve CV.

To further improve the fuel efficiency, the control system according to the present invention additionally performs an idling elimination control. Basically, this idling elimination control is to stop the operation of the engine when the vehicle stops, and when the driving force of the engine becomes unnecessary, i.e., the engine enters into an idling condition. However, to achieve a higher level of fuel efficiency, this system goes further than this basic control. Specifically, the system controls the transmission to terminate the fuel injection if the accelerator pedal is released to decelerate and to stop the vehicle, for preventing the engine from idling.

To avoid the above mentioned riding quality impairment, the release of the starting clutch 5 is controlled appropriately after the termination of the fuel injection and before the halt of the engine. Now, this control, which is executed on condition that the fuel injection is terminated to decelerate the vehicle, is described in reference to the flowcharts shown in FIGS. 3~6.

Figure 3:
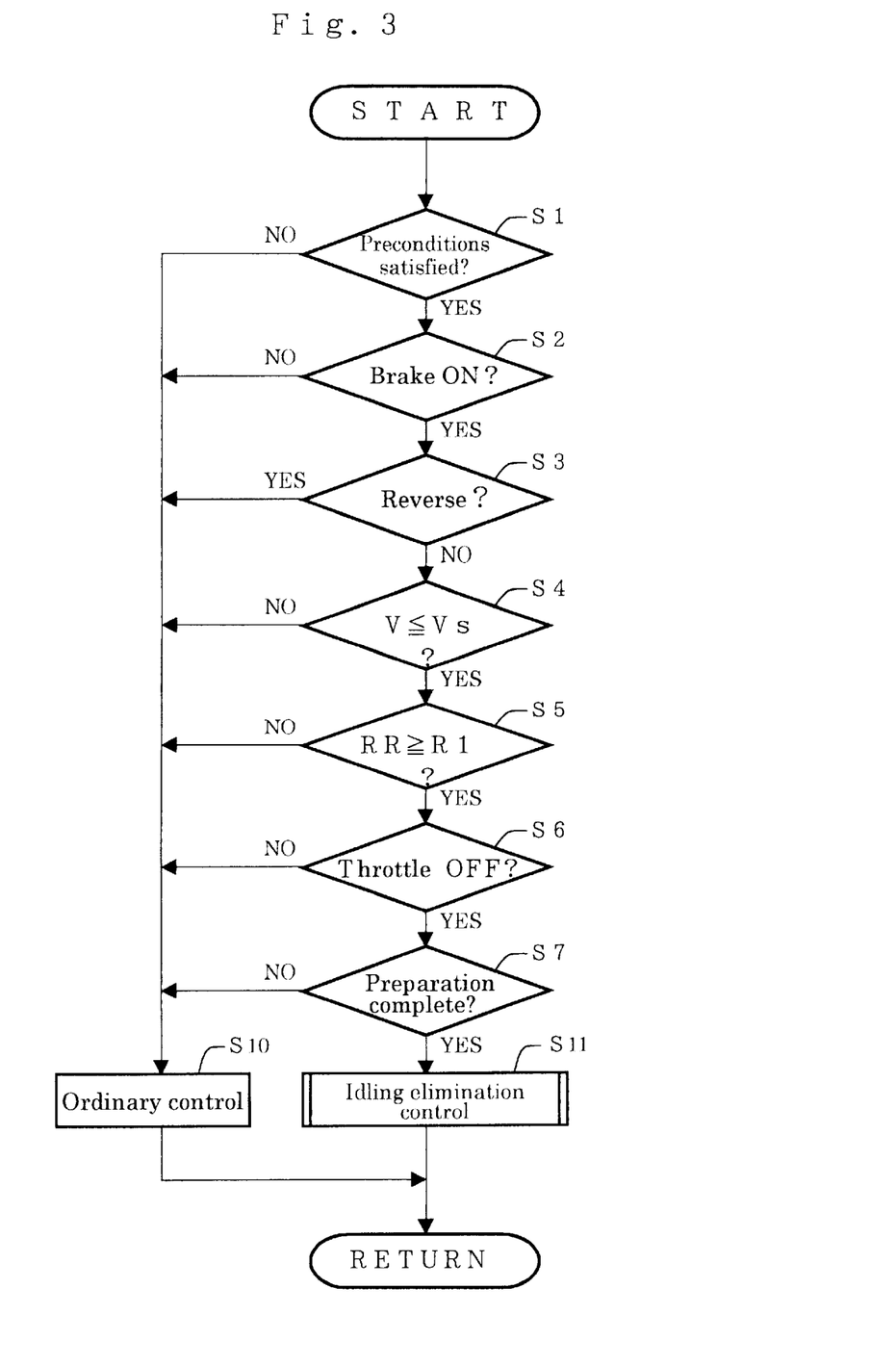
FIG. 3 is a flowchart showing some steps of an idling elimination control according to the present invention, which control is effective when the transmission is operated to decelerate.

This control begins at Step S1, where a judgment is made whether a precondition for the idling elimination control is satisfied or not. As preconditions, for example, the temperature of the oil in the transmission must be above a predetermined value so as not to cause any retardation in responsive actions, and the slope regression inhibitor of the transmission is in good condition. If such preconditions are not satisfied, then the control routine proceeds to Step S10 to control the engine in an ordinary way. In other words, if the preconditions for the termination of the fuel injection are not satisfied, then the control resumes the fuel injection control. The above mentioned slope regression inhibitor functions to retain an enough hydraulic pressure for the brake to keep the vehicle stationary on a slope even while the driver is not depressing the brake pedal.

If the judgment at Step S1 is that the preconditions are satisfied, then the control routine proceeds to Step S2, where a determination is made whether the brake of the vehicle is on or off, i.e., the brake pedal is depressed or not. If the brake is off, then the control routine proceeds to Step S10 to perform the ordinary drive control. On the other hand, if the brake is on, then the control proceeds to Step S3, where a determination is made whether the transmission is in the reverse drive range or not. The idling elimination control is executed only while the transmission is in the forward drive range. Therefore, if the determination indicates that the transmission is in the reverse drive range, then the control routine proceeds to Step S10 to perform the ordinary drive control. On the other hand, if the transmission is not in the reverse drive range, then the control routine proceeds to Step S4, where a determination is made whether the speed V of the vehicle is equal to or lower than a predetermined speed Vs (e.g., 15 km/h) or not. The idling elimination control is a control which is executed when the vehicle is being stopped. Therefore, if the vehicle is not driving at a low speed, the control routine proceeds to Step S10 to perform the ordinary drive control.

When the speed of the vehicle decreases below the predetermined speed, the control routine proceeds to Step S5, where a determination is made whether the reduction ratio RR of the transmission is equal to or greater than a predetermined reduction ratio R1 (LOW ratio) or not. The idling elimination control is executed to stop the engine, so if the engine is stopped, then the speed change ratio cannot be changed thereafter. Therefore, it is necessary that the speed change ratio be adjusted to a LOW ratio before the start of the idling elimination control, so that the vehicle can be started smoothly after the restart of the engine. Thus, the predetermined reduction ratio R1 is a ratio (=2.2) near the LOW ratio (=2.4), and the determination at Step S5 is to determine whether the reduction ratio of the transmission has become a ratio near the LOW ratio or not. Until such a ratio is achieved, the control routine proceeds to Step S10 to perform the ordinary drive control. When such a ratio is achieved, the control routine proceeds to Step S6, where a determination is made whether the throttle of the engine is closed or not. If the throttle is open, i.e., the accelerator pedal is depressed by the driver, then the control routine proceeds to Step S10 to perform the ordinary drive control, and the idling elimination control is not executed because the driver is judged having no intention to stop the vehicle.

As described above, only if the preconditions are satisfied, the brake is on, the transmission is not in the reverse drive range, the vehicle is driving at a speed lower than the predetermined speed, the reduction ratio is almost at the LOW ratio, and the throttle is closed, then the idling elimination control is executed. However, before the idling elimination control, further determinations are made at Step S7 whether preparations for the idling elimination control are complete or not. Here, for example, if the air conditioner of the vehicle is on or not, if there is enough charge in the battery or not, and if the negative pressure used to assist the operation of the brake is at an appropriate level or not are determined. If the air conditioner is on, if the battery do not have enough charge, or if the negative pressure for assisting the brake is short, then the control routine proceeds to. Step S10 to perform the ordinary drive control. On the other hand, if these preparations are judged complete, then the control routine proceeds to Step S11, where the control transits to the idling elimination control.

Figure 4:
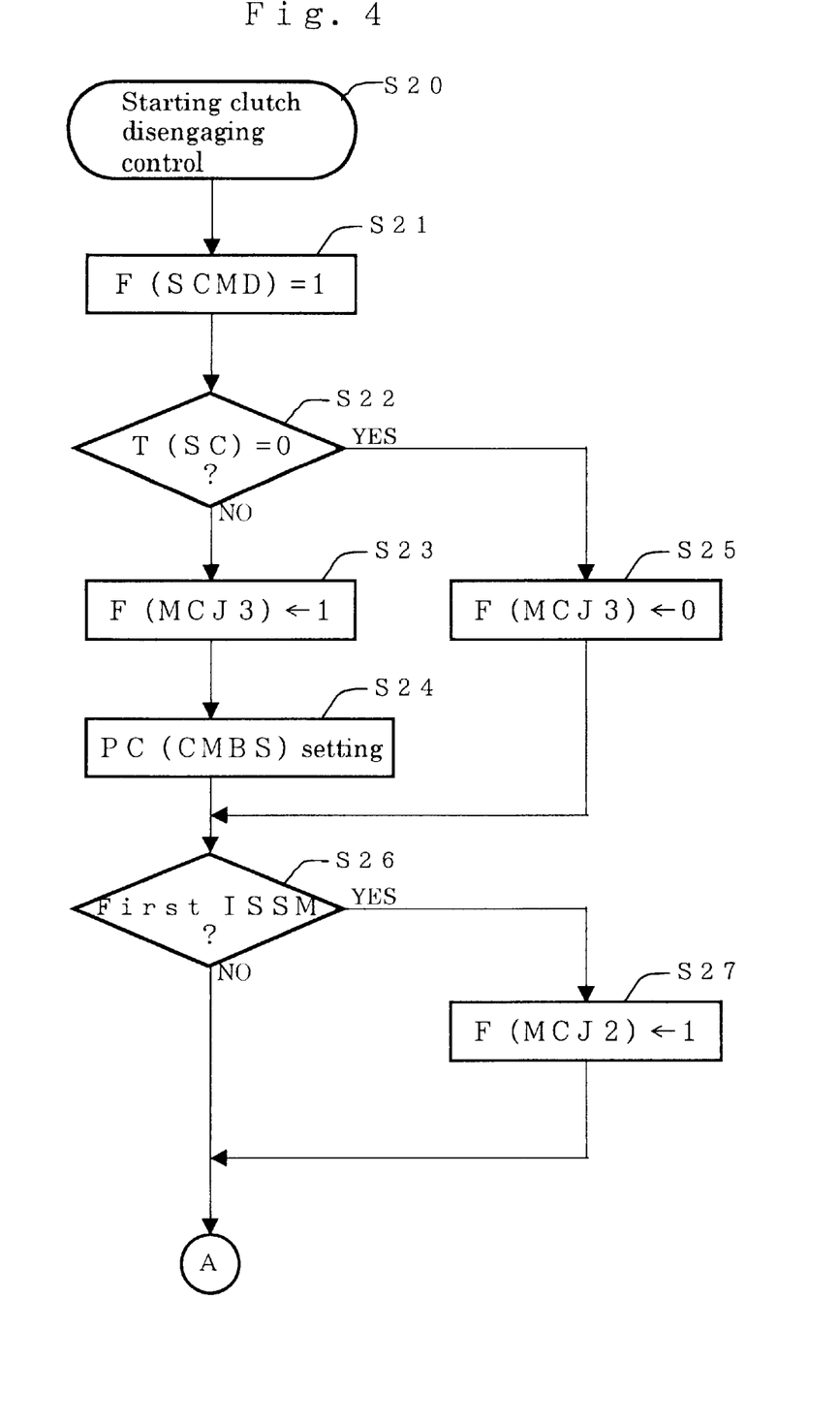
FIG. 4 is another flowchart showing further steps of the idling elimination control.
Figure 5:
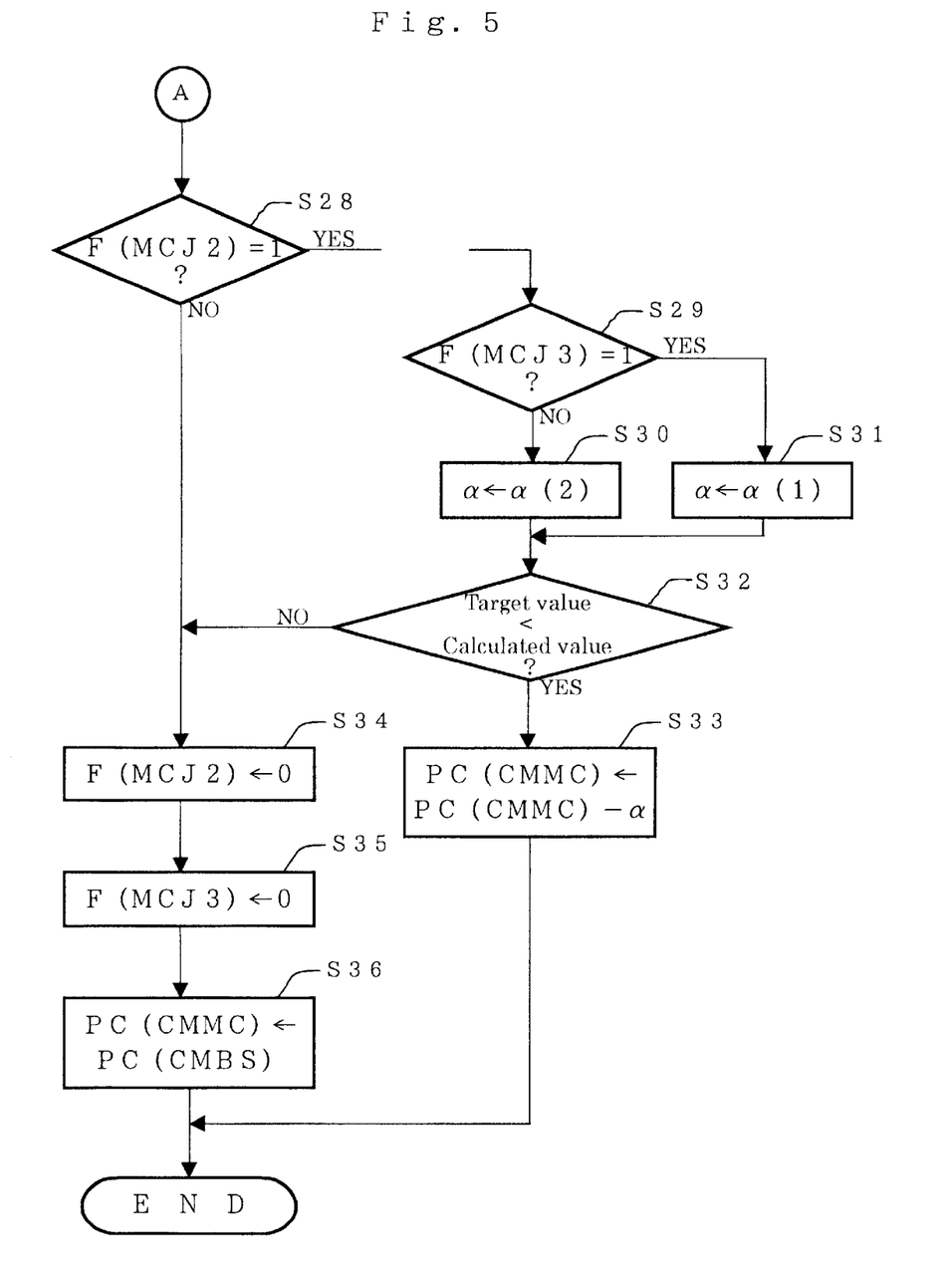
FIG. 5 is another flowchart showing still further steps of the idling elimination control.
Figure 6:
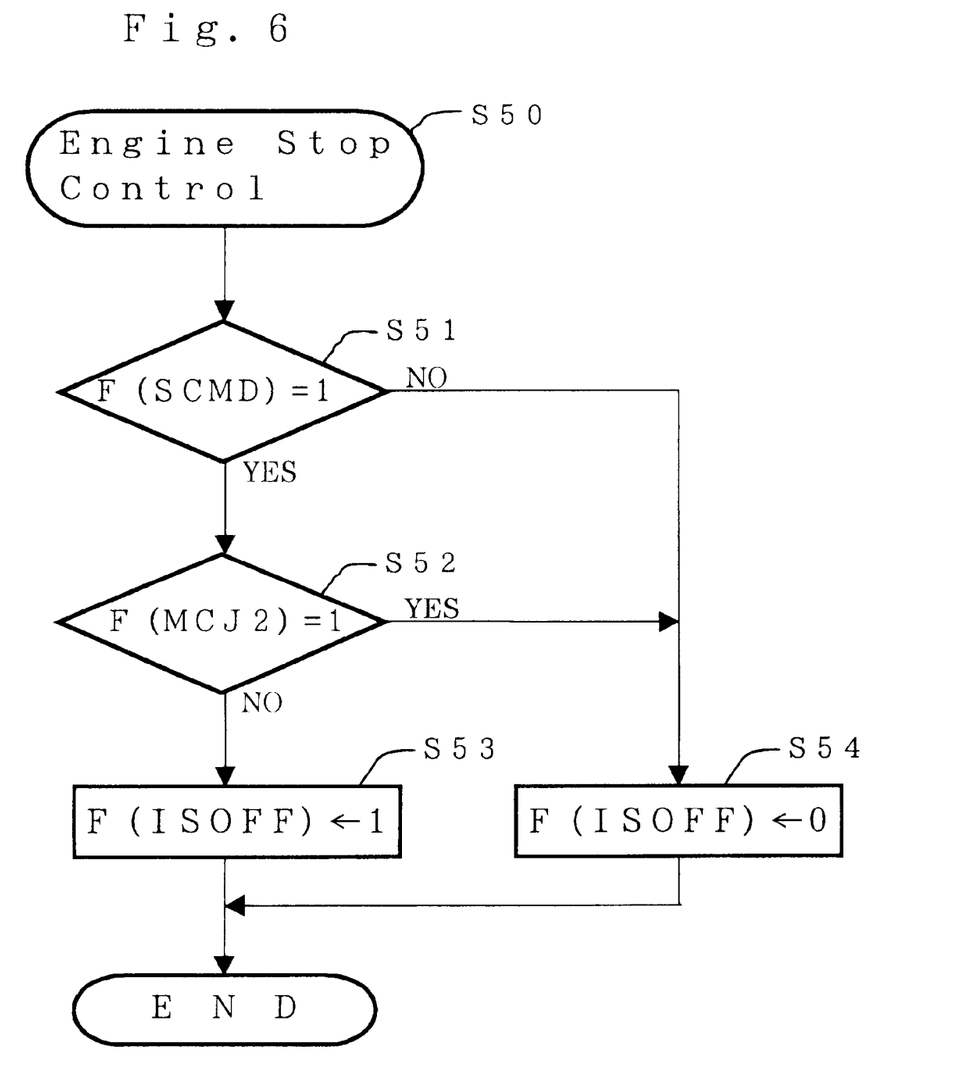
FIG. 6 is another flowchart showing yet further steps of the idling elimination control.

The idling elimination control comprises a starting clutch disengaging control S20 shown in FIGS. 4 and 5 (the circled "A" of the flowchart in FIG. 4 connects with that of FIG. 5, making up a continuous flowchart) and an engine stop control S50 shown in FIG. 6.

At first, a description is given of the starting clutch disengaging control S20. In this control, firstly, a starting clutch off mode selection flag is set up, F(SCMD)=1, at Step S21 to indicate that the control flow has arrived at Step S11. This flag is used as a judgment flag in the engine stop control shown in FIG. 6. Next, at Step S22, a determination is made whether the torque capacity of the starting clutch 5 has become zero, T(SC)=0, or not. If it is not zero, T(SC)≠0, then the control routine proceeds to Step S23, where a clutch gradual release flag is set up F(MCJ3)=1. Then, at Step S24, a target clutch pressure PC(CMBS) is set for the starting clutch 5. This target clutch pressure PC(CMBS) is a pressure to control the clutch so that the torque capacity of the starting clutch becomes zero, T(SC)=0. On the other hand, if the torque capacity is zero, T(SC)=0, then the control routine proceeds to Step S25, where the clutch gradual release flag is set down, F(MCJ3)=0.

Then, the control routine proceeds to Step S26, where a determination is made whether or not this is the first flow through the starting clutch disengaging control. If it is the first flow, then a disengagement control flag is set up, F(MCJ2)=1, at Step S27. It is clear from this that the disengagement control flag is set up, F(MCJ2)=1, when the starting clutch disengaging control has just started.

Then, the control routine proceeds to Step S28, where a determination is made whether the disengagement control flag is up, F(MCJ2)=1, or not. If the disengagement control flag is up, F(MCJ2)=1, then the control routine proceeds to Step S29, where a determination is made whether the clutch gradual release flag is up, F(MCJ3)=1, or not. If the clutch gradual release flag is up, F(MCJ3)=1, then a small value $\alpha(1)$ is set as a pressure reduction value $\alpha$ to reduce the clutch control pressure gradually because the starting clutch 5 needs to be released gradually. On the other hand, if the clutch gradual release flag is down, F(MCJ3)=0, then a large value $\alpha(2)$ ($>\alpha(1)$) is set as the pressure reduction value $\alpha$ to reduce the clutch control pressure rapidly because the starting clutch 5 can be released quickly as the torque capacity of the clutch is zero.

At Step S32, this pressure reduction value $\alpha$ is subtracted from the starting clutch control pressure PC(CMMC) at the moment, and the value resulted from this subtraction is compared with the target value, i.e., the target clutch pressure PC(CMBS) set at Step S24. If the target value is smaller than the value calculated in the above subtraction, i.e., the starting clutch control pressure has not decreased to the target value, then the control routine proceeds to Step S33, where the value resulted from the subtraction of the pressure reduction value $\alpha$ from the current starting clutch control pressure PC(CMMC) is set as a new starting clutch control pressure to control the starting clutch.

On the other hand, if the target value is equal to or greater than the value calculated in the above subtraction, i.e., the starting clutch control pressure has decreased to the target value, then the control routine proceeds to Steps S34, S35 and S86. There, the disengagement control flag is set down, F (MCJ2)=0, at Step S34, the clutch gradual release flag is set down, F(MCJ3)=0, at Step S35, and the target clutch pressure PC(CMBS) is set as the starting clutch control pressure PC(CMMC) at Step S36. It is clear from the above description that, in the starting clutch disengaging control S20, the clutch control pressure is decreased gradually to the target clutch pressure PC(CMBS), i.e., the starting clutch 5 is released gradually.

Now, a description is given of the engine stop control S50 shown in FIG. 6. In this control, at first, a determination is made whether the starting clutch off mode selection flag is up, F(SCMD)=1, or not at Step S51. If it is down, F(SCMD)=0, which condition indicates that the above mentioned starting clutch disengaging control S20 is not being performed, then the control routine proceeds to Step S54, where an idling elimination control flag is set down, F(ISOFF)=0. In this case, the idling elimination control is not performed. On the other hand, if the starting clutch off mode selection flag is up, F(SCMD)=1, which condition indicates that the above mentioned starting clutch disengaging control S20 has been started, then the control system judges that the conditions required for stopping the engine are satisfied and allows the engine to be stopped by Maintaining the stoppage of the fuel injection. Therefore, the control routine proceeds to Step S52, where a determination is made whether or not the disengagement control flag is down, F(MCJ2)=0, i.e., whether the control for releasing the starting clutch 5 gradually so as to make the torque capacity of the starting clutch 5 zero has completed or not.

If the disengagement control flag is up, F(MCJ2)=1, which condition indicates that the control for releasing the starting clutch 5 is being executed, then the control routine proceeds to Step S54, where the idling elimination control flag is set down, F(ISOFF)=1, and the idling elimination control is not yet started. If the disengagement control flag is down, F(MCJ2)=0, which condition indicates that the control for releasing the starting clutch 5 has completed, then the control routine proceeds to Step S53, where the idling elimination control flag is set up, F(ISOFF)=1, and the idling elimination control is executed. Specifically, this idling elimination control stops the engine forcibly by using the electrical motor.

As described above, when the brake is operated to stop the vehicle while the vehicle is decelerating without fuel injection, the idling elimination control is executed after the control to release the starting clutch 5 gradually is complete. In this way, the vehicle is stopped smoothly without any shock after effecting an appropriate engine brake. When the vehicle stops, the engine has also stopped. In this condition, the speed change ratio of the transmission of the vehicle is set at the LOW ratio.

The above transmission comprises an engine whose drive force is assisted by the operation of an electrical motor. However, the present invention is not limited to this type of transmission and can be implemented also with a transmission which does not incorporate an electrical motor. Not only the above metal V-belt type continuously variable transmission but also other types of transmission, even a transmission with a multiple speed ratio speed change mechanism, can be utilized for the implementation of the present invention as long as they incorporate starting clutches.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.11-191317 filed on Jul. 6, 1999, which is incorporated here in by reference.

What is claimed is:

1. A control system for a power transmission used for driving a vehicle, said transmission comprising an engine, a speed change mechanism, and a main clutch, said speed change mechanism conveying a driving force from said engine with a speed change, said main clutch controlling transmission of said driving force through said speed change mechanism;

wherein:
while said vehicle is being decelerated for a halt, said control system terminates fuel supply to said engine for decelerating said vehicle,
releases said main clutch gradually, while the vehicle is still moving and under predetermined conditions, the predetermined condition including a conditions including a condition that a vehicle brake is being and a condition that a vehicle speed has become equal to or lower than a predetermined speed;
and than controls said power transmission to stop said vehicle.

2. The control system as set forth in claim 1, wherein:
said predetermined conditions includes following conditions: reduction ratio of said speed change mechanism has come to be almost at a LOW ratio, and a throttle of said engine is essentially closed; and when all said conditions are satisfied, control system releases said main clutch gradually and then controls said transmission to stoop said vehicle.

3. The control system as set forth in claim 1, wherein:

said speed change mechanism comprises a continuously variable transmission; and when said control system decelerates and stops said vehicle, said control system sets speed change ratio of said continuously variable transmission to a LOW ratio.

4. The control system as set forth in claim 1, wherein:

said power transmission further comprises an electrical motor, which is disposed in series with said engine, and said electrical motor assists said driving force of said engine.

5. The control system as set forth in any of claims 1~4, wherein:

when said control system controls said power transmission to stop said vehicle after releasing said main clutch gradually under said predetermined conditions, said control system maintains said termination of fuel supply so as to stop said engine.

6. The control system as set forth in claim 5, wherein:

only when temperature of a hydraulic oil used in said speed change mechanism is equal to or higher than a predetermined temperature, which condition allows no delay in hydraulically controlled actuation, said control system stops said engine.

7. The control system as set forth in claim 5, wherein:

only when said speed change mechanism is set in a forward drive range, said control system stops said engine.

\* \* \* \* \*